United States Patent [19]
Payne

[11] Patent Number: 4,912,897
[45] Date of Patent: Apr. 3, 1990

[54] FLOORING SYSTEMS WITH SEGREGATED SERVICE FEEDS

[75] Inventor: Harold J. W. Payne, Chester, England

[73] Assignee: Bally Engineered Structures, Inc., Bally, Pa.

[21] Appl. No.: 890,184

[22] PCT Filed: Mar. 19, 1986

[86] PCT No.: PCT/US86/00570

§ 371 Date: Jun. 19, 1986

§ 102(e) Date: Jun. 19, 1986

[87] PCT Pub. No.: WO86/05832

PCT Pub. Date: Oct. 9, 1986

[51] Int. Cl.$^4$ ............................................. E04B 5/48
[52] U.S. Cl. ......................................... 52/220; 174/49; 174/96
[58] Field of Search .................. 52/220, 221; 174/48, 174/49, 95, 96, 97

[56] References Cited
U.S. PATENT DOCUMENTS

| | | | |
|---|---|---|---|
| 3,061,663 | 10/1962 | Reiland | 174/49 |
| 3,316,680 | 5/1967 | Chrastek | 52/126 |
| 3,453,791 | 7/1969 | Fork | 52/221 |
| 3,851,674 | 12/1974 | Fork | 52/221 |
| 4,030,259 | 6/1977 | Meckler | 52/221 |
| 4,523,416 | 6/1985 | Payne | 52/220 |
| 4,558,546 | 12/1985 | Nusbaum | 52/221 |
| 4,559,749 | 12/1985 | Nusbaum | 52/221 |

FOREIGN PATENT DOCUMENTS

| | | |
|---|---|---|
| 094780 | 11/1983 | European Pat. Off. . |
| 129416 | 12/1984 | European Pat. Off. . |
| 0465229 | 5/1937 | United Kingdom . |
| 0787567 | 12/1957 | United Kingdom . |
| 2115853 | 9/1983 | United Kingdom . |
| 2121450 | 12/1983 | United Kingdom . |
| 2141464 | 12/1984 | United Kingdom . |
| 2146680 | 4/1985 | United Kingdom . |

Primary Examiner—Henry E. Raduazo
Attorney, Agent, or Firm—Parmelee, Miller, Welsh & Kratz

[57] ABSTRACT

A flooring system with services segregation for an existing base or substrate (10) to give a new floor, comprises elongate segregation ducting (20) shown with spaced parallel sides (34) and medial divider(s) (36) extending therealong, the sides (34) and divider(s) (36) being apertured (48, 40) to communicate selectively with trough-like elements (50) bridging over space below for segregation of service passageways to each side of the divider(s) (36); and elongate supports (22), for the new floor are shown extending away from the segregation ducting in spaced parallel relation and definhe segregated further passageways (22A, F1, F2) communicating with the apertures (48) of the sides of the segregation ducting.

7 Claims, 2 Drawing Sheets

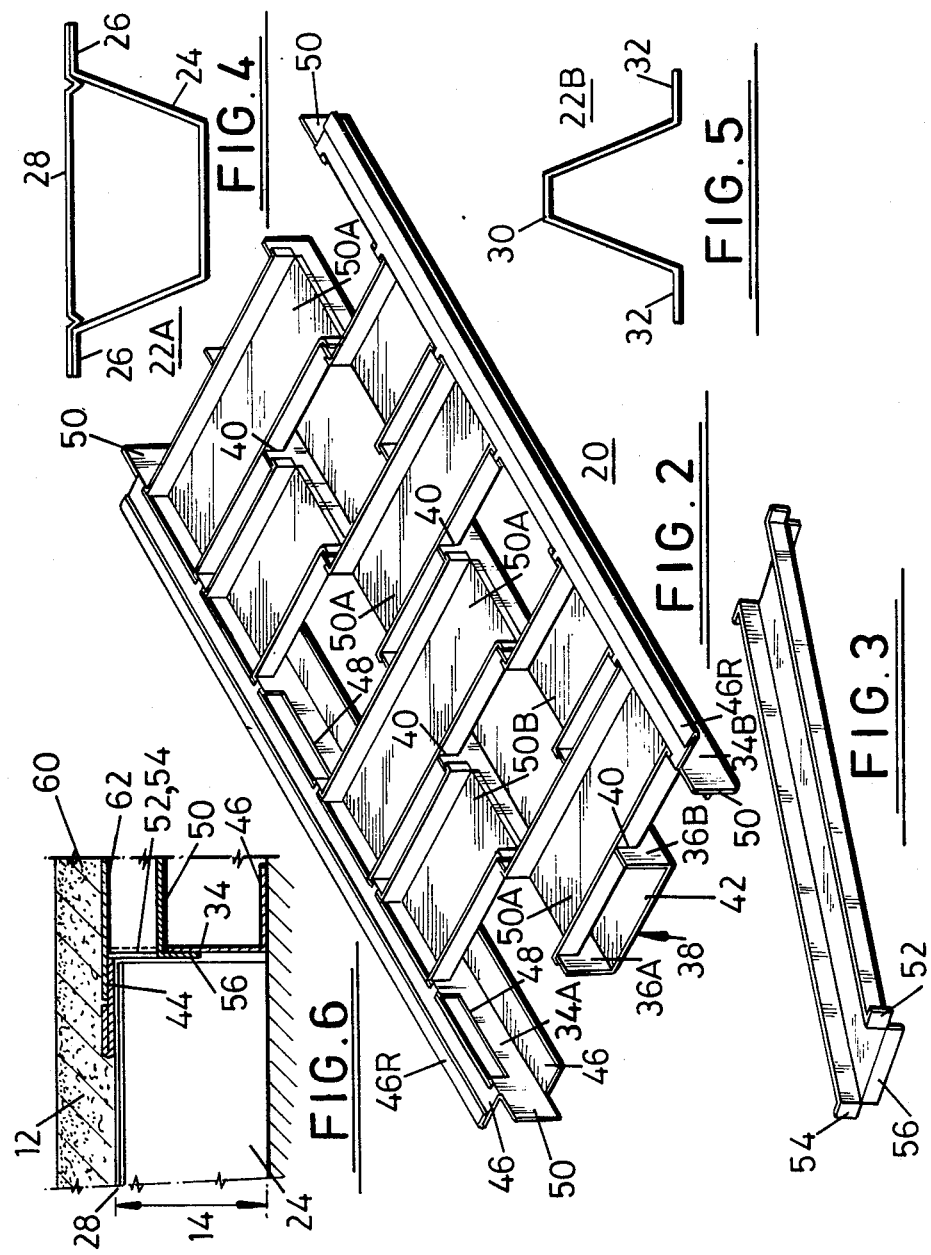

FLOORING SYSTEMS WITH SEGREGATED SERVICE FEEDS

The invention relates to flooring systems with service trunking facilities.

So-called suspended floors using pillars readily afford maximum flexibility in arrangement of service feeds, including electrical cable of various classes, between support pillars at corners of rectangular floor panels. Other "added-on" flooring systems use corrugated sheet material between the base or substrate to be floored and the actual floor sheeting or boarding to be installed, and there is less flexibility in arrangement of service feeds, albeit with greater potential discipline in the sense that individual corrugation channels can be dedicated to specific types or classes of service, which are thus kept segregated by sides of the corrugation channels. Manifestly, however, such rigid discipline presents problems for running services transversely of their dedicated channel or channels to outlets or even other similarly dedicated channels, whether from loss of segregation discipline in passage-ways formed transversely to the corrugated sheet, or from difficulty of "fishing" for electrical cable if such segregation is maintained by transverse ducting such as using one or more dividers and upwardly-closed channel members at base/substrate level to and between apertures at corresponding levels in the dividers (see British patent specification no. 2121450A), or from difficulty of affording full "metal-shell" type isolation for electrical power feed services.

Objects of this invention include satisfying one or more of improving upon added-on flooring systems and improving upon the system of British patent specification no. 2121450A and affording viable alternative(s) thereto.

According to one aspect of this invention, a flooring system to go onto an existing base or substrate avoids use of corrugated sheet to support the flooring panels intended to be added on, such flooring system comprising discrete elongate flooring panel supports to extend in parallel spaced relation from sides of transversely extending segregation ducting, the supports and the ducting affording mutual communicating accommodation for service feeds in and between their respective directions.

Such a system is suited to installation using its transverse segregation ducting for reference purposes, i.e. installing the latter at suitable spaced intervals so as then to be suitably interconnected via said elongate flooring panel supports, rather than using spaced corrugated sheeting as reference for installing the segregation ducting. There is, of course, also self-evident scope for saving material relative to systems using corrugated sheet, and at least some of the elongate supports may serve simply as dividers rather than service passages in themselves.

In one preferred embodiment of said one aspect of this invention, at least some elongate flooring panel supports comprise upwardly open members of channel section and top closures therefor to provide fully isolated feedways, say of the aforementioned "metal-shell" type for electrical power outfeeds. Spacings between parallel-installed such elements can serve for other services, i.e. segregated from electrical power. Moreover, other elongate flooring panel supports could, if desired, divide such spacings to further segregate such other services, and may suitably comprise downwardly open elements of channel section, conveniently or as may be desired, narrower than those first-mentioned. We do not, of course, rule out the possibility that such downwardly open elements are themselves traversed by service feeds.

Turning to another aspect of this invention, segregation ducting is proposed having spaced parallel sides, at least one medial divider parallel to the sides, and trough- or tray-like elements extending selectively between aperturing of the sides and divider(s) at upper parts thereof, thereby leaving room below for passage of segregated service feeds with appropriate access therefor up into said trough- or tray-like elements.

Suitable sides and divider(s) are each plates having slotting from their upper edges to match channel sections of the trough- or tray-like elements which themselves preferably have bent-out ears to ends of sides and/or bottoms for securement purposes relative to sides and divider(s).

Three-way services segregation is particularly readily provided for where two said dividers are afforded by sides of an upwardly-open channel-section power cell part, say with cells for communications or the like to each side thereof. Such medially-disposed upwardly-open channel section power cell part particularly aids structural integrity of segregation duct sections hereof, perhaps especially so where sides have upper and lower flanges with the former bent below extensions of the preferred slotting apertures so as to take ears of the sides of the trough- or tray-like elements.

Specific practical implementation of this invention will now be described, by way of example, with reference to the accompanying drawing, in which:

FIG. 2 is a similar perspective view of a segregation duct section alone;

FIG. 3 is a perspective view of a segregation element;

FIGS. 4 and 5 are sections through trunking and dividers; and

FIG. 6 is a fragmentary section through what is shown in FIG. 1, see X—X plus flooring panelling.

Figure 1:
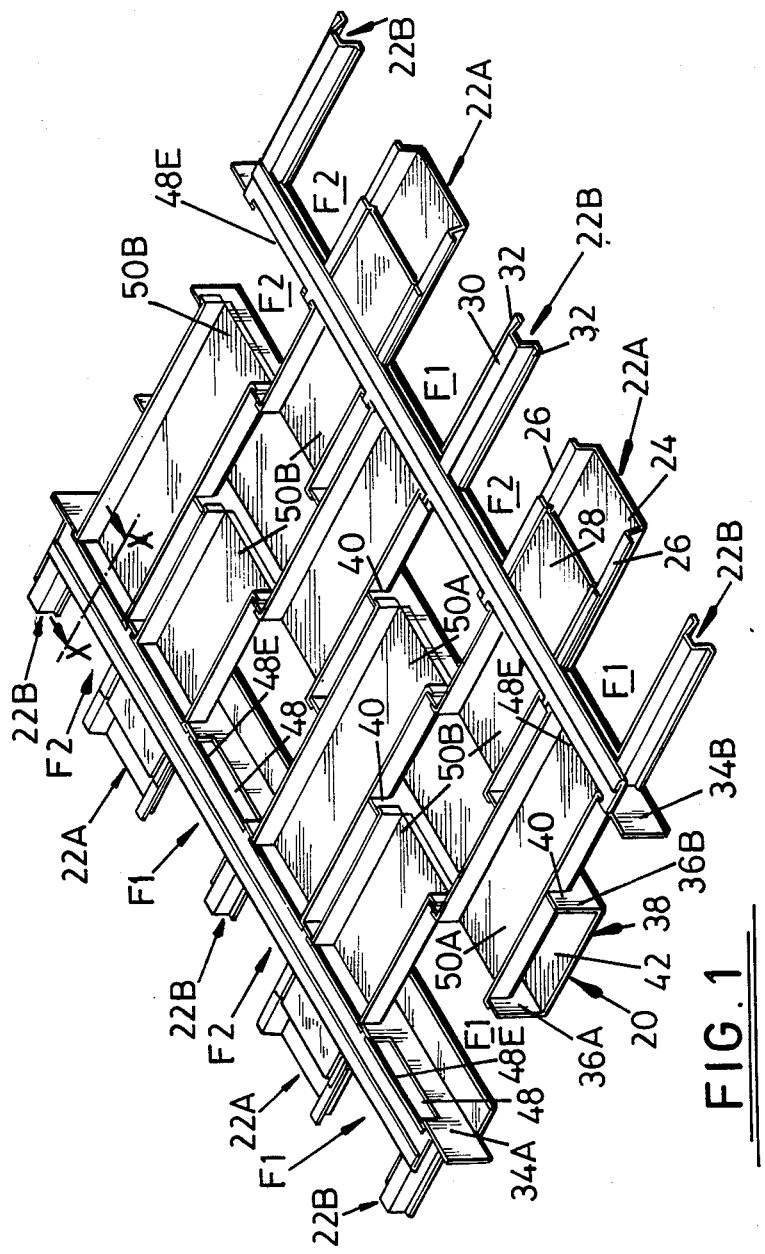
FIG. 1 is a perspective view of part of the support system for an added-on floor.

In the drawings, a base or substrate 10, such as an existing floor to be refurbished, is to carry added-on flooring 12 shown as panels supported at a spacing 14 from such base or substrate 10. The spacing 14 is thus available for trunking services feeds which it is a purpose hereof efficiently to achieve in a segregated manner.

Accordingly, for three-way segregation, the illustrated system has segregation ducting 20, actually in the form of discrete sections (of which one is shown) that can be fitted together end-to-end along or across existing floors, if necessary and usually for broad floors in spaced parallel relation. Extending to each side of the segregation ducting 20, are elongate floor support elements 22 actually shown in two forms, namely service feedway trunking 22A and dividers 22B. It will be appreciated that the dividers 22B can actually define further service feedways to either side thereof, i.e. two such further feedways F1, F2 to each side of that represented by the trunking 22A.

The illustrated preferred services feedway trunking 22A comprises an upwardly-open channel section part 24 with side flanges 26 and a cover part 28 edge-secured at those flanges 26. The illustrated preferred divider 22B comprises a downwardly-open channel section part presenting a base 30 and having side flanges 32 for securement to the base or substrate 10. The trunking cover parts 28 and divider bases 30 serve to support the flooring panelling 12 and will be at the same height.

The illustrated preferred segregation ducting 20 has spaced parallel sides 34A, 34B and, between those sides, spaced parallel dividers 36A, 36B. The dividers 36A, 36B are sides of an upwardly open channel section part 38 that are slotted at 40 from their top edges and in mutual registration. The part 38 has a bottom web 42 to lie on the base or substrate 10. The sides 34A, 34B have upper and lower flanges 44, 46 and slots 48 extending from the tops of their upstands also in registration with those 40 of dividers 36A, 36B, but referenced only where not occupied by bridging parts 50 to be described. Extending ears of the upstands readily permit end-to-end connection of ducting sections, say via suitable selective joggles thereto.

The slots 40 and 48 are shown corresponding to and accommodating endless tray or trough elements 50 not only by corresponding to their cross-sectional shape, but also by taking bent over ears from their sides (52, 54) and bottom (56). For the sides 34A, 34B of the segregation ducting 20, such accommodation requires end and side extension of the slots 48 at 48E into the upper flanges 44. Then, securement of those ears to sides 34 and divider 36, for example by spot welding, assures structural integrity of the segregation ducting sections. The trough or tray elements 50 bridge over between the slottings 40, 48 and leave space below for service feeds to traverse along the segregation ducting 20 between dividers 36A, 36B and also between those dividers and sides 34A, 34B. It will, of course, be noted that only two different sizes of the bridge parts 50 (see subscripts A and B) are required for the envisaged three-way segregation in and to each side of the central channel member 38, and with complete preservation of such segregation in going via those bridge parts 50 into respective sideways feedways at trunkings 22A and to each side thereof at F1, F2.

A suitable cover 60 for the segregation ducting 20 has a lower surface faced 62 with metal sheet to match the basic duct work and give required safety/isolation. It is useful to have upper flanging 46 of the sides of the ducting 20 returned at 46R and for the facing 62 to be short of edges of the cover panel 60.

Overall, it will be appreciated that the system as described is particularly successful in meeting all objectives hereof. Moreover, the fabrication of the segregation ducting 20 in sections and provision of the trunkings 22A and dividers 22B in any desired lengths enables ready introduction and handling on site, especially in terms of avoiding the problems of tube corrugated sheet into existing buildings whose windows may well be too small.

Also, it will be appreciated that, compared with previous proposals using corrugated sheet to support the new flooring, advantage further arises from flexibility in terms of strengths and gauges of materials used for trunking 22 (also ducting 20) so as to meet particular requirements and loadings.

I claim:

1. A flooring system for supporting a new floor surface spaced above an existing base or substrate and for providing segregated service feeds above the existing base or substrate, the flooring system comprising service feed segregation ducting defined by spaced parallel sides extending in a first direction and discrete elongate parallel flooring panel supports extending in a second direction from the sides of the service feed segregation ducting, the spaced parallel sides of the service feed segregation ducting having upper parts provided with apertures communicating with selected extending flooring panel supports, at least one medial divider parallel to the sides of the service feed segregation ducting, the divider having an upper part provided with apertures corresponding to the apertures in the sides of the service feed segregation ducting, and trough- or tray-like elements extending selectively between said apertures of the sides of the services feed segregation ducting and the divider and leaving room below for passage of service feeds through the service feed segregation ducting, the flooring panel supports and the segregation ducting affording mutually communicating segregated accommodation for service feeds in and between the first and second directions.

2. A flooring system according to claim 1, wherein, as their said apertures, the sides and divider(s) have slotting from their upper edges to match channel sections of said flooring panel supports.

3. A flooring system according to claim 1, wherein the trough- or tray-like elements have bent-out ears at ends thereof for securing them relative to the sides and divider(s).

4. A flooring system according to claim 1, wherein the segregation ducting has two spaced parallel dividers to afford three-way services segregation.

5. A flooring system according to claim 4, wherein said two dividers comprise sidewalls of an upwardly open channel section located between and spaced from said sides of the segregation ducting to accommodate one service-feed within the channel section and two others each between such channel section and a different said side of the segregation ducting.

6. A flooring system according to claim 1, comprising a top cover fitting over said segregation ducting between flooring panels over said supports.

7. A flooring system according to claim 6 wherein all of side, divider and trough- or tray-like parts of said segregation ducting are of metal and said top cover has a metal bottom facing such parts.

* * * * *